United States Patent

Yashima et al.

[11] Patent Number: 5,267,228
[45] Date of Patent: Nov. 30, 1993

[54] SUBSTRATES FOR OPTICAL CARDS, PROCESS FOR PREPARING SUBSTRATES FOR OPTICAL CARDS, OPTICAL CARDS AND APPARATUS FOR RECORDING AND REPRODUCING INFORMATION ON OPTICAL CARDS

[75] Inventors: Masataka Yashima, Yokohama; Osamu Kanome, Kawasaki; Hirofumi Kamitakahara; Tsuyoshi Santoh, both of Yokohama; Hiroyuki Sugata, Yamato; Tetsuya Sato, Chichibu; Hitoshi Yoshino; Hisanori Hayashi, both of Kawasaki, all of Japan

[73] Assignee: Canon Kabushiki Kaisha, Tokyo, Japan

[21] Appl. No.: 680,529

[22] Filed: Apr. 4, 1991

[30] Foreign Application Priority Data

Apr. 5, 1990 [JP] Japan .................. 2-89074
Mar. 25, 1991 [JP] Japan .................. 3-060240

[51] Int. Cl.⁵ .......................... B29C 47/00
[52] U.S. Cl. ............................ 369/100; 369/275.1; 264/1.3; 264/106
[58] Field of Search ............ 369/100, 275.1, 275.4, 369/275.3, 275.2, 109, 112; 235/454, 456, 476, 477, 488, 495; 264/1.3, 106; 427/393.5

[56] References Cited

U.S. PATENT DOCUMENTS

| | | | |
|---|---|---|---|
| 4,798,694 | 1/1989 | Sugata et al. | 264/87 |
| 4,836,874 | 6/1989 | Foster | 156/209 |
| 4,840,821 | 6/1989 | Miyazaki et al. | 427/430.1 |
| 4,860,273 | 8/1989 | Sawano et al. | 369/100 |
| 4,944,967 | 7/1990 | Yabe et al. | 427/393.5 |
| 4,991,541 | 2/1991 | Sugata et al. | 118/716 |
| 5,048,745 | 9/1991 | Sato et al. | 264/106 |
| 5,075,060 | 12/1991 | Imataki | 264/1.3 |
| 5,137,661 | 8/1992 | Kanome et al. | 264/1.3 |

FOREIGN PATENT DOCUMENTS 0268402  5/1988  European Pat. Off. .
0268482  5/1988  European Pat. Off. .
63-300439 7/1988  Japan .

OTHER PUBLICATIONS

Patent Abstracts of Japan, vol. 12, No. 497 (P-806), Dec. 26, 1988; & JP-A-63 205 855 (Canon Inc.) Aug. 25, 1988, Abstract.
Patent Abstracts of Japan, vol. 12, No. 23 (P-658), Jan. 23, 1988; & JP-A-62 177 747 (Canon Inc.) Aug. 4, 1987, Abstract.

*Primary Examiner*—Paul M. Dzierzynski
*Assistant Examiner*—Kiet T. Nguyen
*Attorney, Agent, or Firm*—Fitzpatrick, Cella, Harper & Scinto

[57] ABSTRACT

A substrate for an optical card having tracking grooves in a stripe form formed on the surface of an extrusion-molded thermoplastic resin sheet is characterized in that the direction of the tracking grooves is in parallel to the extrusion direction of the thermoplastic resin sheet, and the recording or reproduction using the optical card is characterized by that the optical card is bent and reciprocally moved along the direction of tracking grooves.

6 Claims, 7 Drawing Sheets

SUBSTRATES FOR OPTICAL CARDS, PROCESS FOR PREPARING SUBSTRATES FOR OPTICAL CARDS, OPTICAL CARDS AND APPARATUS FOR RECORDING AND REPRODUCING INFORMATION ON OPTICAL CARDS

BACKGROUND OF THE INVENTION

1. Field of the Invention

This invention relates to substrates for optical recording media for recording and reproducing information by light, such as laser beam, etc., particularly substrates for optical cards and to a process for preparing the same.

2. Related Background Art

In optical recording media, information is recorded by forming pits in the recording layer by irradiation of laser beam with or without the simultaneous application of an appropriate external energy or force, for example, heat or magnetic force, where the following types are known:

1. Pit-forming type using a recording layer of Te, Te-C, etc.,
2. Rim-forming type using an organic pigment,
3. Phase change type by inorganic multicomponent compounds such as Ge-Sn-Te, TeO-SnGe, etc., and
4. Magneto-optical type which records by changing the spin direction by using multi-comonent compounds such as Tb-Fe-Co, Tb-Fe-Gd-Co, etc., and conducting photoirradiation while applying a magnetic field thereto.

The pits formed in the recording layer by any of these procedures are exposed to a substantially weaker laser beam than the recording beam, and the reflected light from the recording layer is detected to determine the presence or absence of pits and reproduce the recorded information.

In such an optical recording medium, as shown in FIG. 2B, usually a recording layer 62 is formed on a transparent plastic substrate 28, and irradiation of a laser beam or receiving of reflected light for recording or reproduction is carried out through the substrate 28.

Generally, irradiation of a laser beam and receiving of reflected light are carried out together with a polarizing beam splitter (PBS) 22 and a quarter wave plate (QWP) 23 in order to eliminate the return light of the laser beam and efficiently receive the reflected light, as shown in FIG. 2A.

That is, the straight polarized beam emitted from a semiconductor laser 21 passes through PBS 22 and then passes through QWP 23 to be converted to a circular polarized beam, which is focused to a spot, about 1 $\mu$m in diameter, through a focusing lens 24 to enter the substrate 28 and irradiate the recording layer 62. Then, the light reflected on the recording layer 62 passes again through QWP 23 to be converted again to the straight polarized beam, which enters PBS 22. At that time, as the reflected light differs by 90° in the polarizing plane from the incident light, the reflected light can not pass PBS, and is reflected by PBS to reach a photo detector (PD) 25.

However, as the reproduction of information is carried out with the reflected light from the recording layer through the substrate, as mentioned above, if the substrate 28 has a refractivity, the reflected light is not converted to the straight polarized beam exactly by 90° difference in the polarizing plane from the incident light when the reflected light passes through QWP, and a portion of the reflected light is not reflected by PBS but passes through PBS, and the not-reflected light returns to the semiconductor laser, causing noise on the light source, and the S/N ratio lowers due to the decrease in the reflected light quantity which reaches PD.

Double refraction of the substrate occurs owing to the photoelasticity coefficient C peculiar to a material multiplied by a residual mechanical stress difference per se, as shown by the following formula (1):

$$\text{Double refraction:}(BR)[nm] = (\lambda\delta/2) \cdot C \cdot t \ (\delta_1 - \delta_2) \qquad (1)$$

where
- $\delta$: retardation
- $\lambda$: wavelength
- $C$: photoelasticity coefficient
- $\delta_1 - \delta_2$ = stress difference As a material for substrate 28 for information recording medium, such as optical disk, etc. polycarbonate is regarded as promising owing to low hydroscopicity, high heat resistance and distinguished moldability. However, polycarbonate resin has so high a photoelasticity coefficient that double refraction is very liable to occur. Thus, in order to suppress double refraction when a substrate for optical disk having preformats such as track grooves or pits is prepared by molding the polycarbonate resin, processes and conditions for molding the polycarbonate to prevent occurrences of residual strains as much as possible, have been investigated, and polycarbonate substrates with low double refraction have been prepared.

An optical card, is an optical recording medium whose recording and reproduction of information are conducted by relative reciprocal movements to a light beam for recording and reproduction. It is preferably bent to a slight degree with rollers 27 to eliminate vibration and slipping of the optical card when the optical card is subjected to reciprocal movement in the direction F traversing with respect to the light source 21 by a driving roller 26 during the recording and reproduction as shown in FIGS. 2A and 2B. However, when the polycarbonate substrate is bent in such a manner as above, a double refraction occurs or increases on the substrate 28, resulting in lowering of S/N ratio of the signal.

SUMMARY OF THE INVENTION

The present invention has been established to solve the foregoing problems of prior art.

An object of the present invention is to provide a substrate for optical cards with less occurrence of double refraction when an external force is applied to the substrate during the recording and reproduction, and a process for preparing that substrate.

Another object of the present invention is to provide an optical card capable of recording and/or reproducing signals in a high S/N ratio even if an external force is applied to the card during the recording and/or reproduction.

Other object of the present invention is to provide an apparatus for recording an optical card, which is capable of recording information with a high S/N ratio on the optical card.

A further object of the present invention is to provide an apparatus for reproducing an optical card, which is capable of reproducing information recorded on the optical card with a high S/N ratio.

Still further object of the present invention is to provide a process for preparing substrates for the optical cards having exactly transferred preformats with less occurrence of double refraction even if an external force is applied to the optical cards during the recording and reproduction.

Still further object of the present invention is to provide a process for recording information on an optical card with a high S/N ratio.

Still further object of the present invention is to provide a process for reproducing information recorded on an optical card with a high S/N ratio.

The present substrate for an optical card comprises an extrusion-molded thermoplastic resin sheet and tracking grooves in a stripe form formed on the surface of the thermoplastic resin sheet, and the direction of the tracking grooves are in parallel to the extrusion direction of the thermoplastic resin sheet.

Furthermore, the present process for preparing a substrate for an optical card is characterized by molding tracking grooves in a stripe form on a surface of the extrusion-molded thermoplastic resin sheet by a stamper so that the direction of the tracking grooves is parallel to the extrusion direction of the thermoplastic resin sheet.

Furthermore, the present optical card comprises (i) a substrate for an optical card, having stripy tracking grooves on the surface of the extrusion-molded thermoplastic resin sheet, wherein the extrusion direction of the thermoplastic resin sheet is parallel to the direction of the tracking grooves, (ii) at least one of a recording layer and a reflection layer and (iii) a protective substrate, all laid upon one another in this order.

Furthermore, the present recording apparatus for recording information on an optical card comprises a substrate prepared from an extrusion-molded thermoplastic resin sheet, a recording layer, or both a recording layer and a reflecting layer, and a protective substrate, all laid upon one another in this order. The present recording apparatus comprises (i) a unit including light source for focusing a light beam on the recording layer surface of the optical card through the substrate; (ii) a unit for reciprocally moving the optical card the focused light beam along the extrusion direction of the thermoplastic resin sheet; (iii) a unit for modulating the intensity of the light beam according to information to be recorded; and characteristically (iv) a means for bending the optical card toward the light source along the extrusion direction of the thermoplastic resin sheet.

Furthermore, the present reproducing apparatus is for reproducing information recorded on an optical card, comprising a substrate prepared from an extrusion-molded thermoplastic resin sheet, at least one of a recording layer and a reflecting layer, and a protective substrate, all laid upon one another in this order, wherein information is given in an optically detectable pit form on the recording layer or the substrates or both. The present recording apparatus comprises (i) a unit including a light source for focusing light on the recording layer surface or the reflecting layer surface of the optical card through the substrate; (ii) a unit for reciprocally moving the optical card along in the extrusion direction of the thermoplastic resin sheet; (iii) a unit for detecting the reflected light from the recording layer or the reflecting layer; and characteristically, (iv) a means for bending the optical card toward the light source along the extrusion direction of the thermoplastic resin sheet.

Furthermore, the present process for recording information on an optical card comprising extrusion-molded thermoplastic resin sheet substrate, the recording layer or both of the recording layer and a reflecting layer, and a protective substrate, all laid upon one another in this order, comprises focusing the modulated recording light through the substrate on the surface of the recording layer to cause an optically detectable change in the recording layer, wherein the recording of information is carried out with the optical card bent towards a light source of the recording light along extrusion direction of the thermoplastic resin sheet.

Furthermore, the present process for reproducing recorded information in an optical card comprising an extrusion-molded thermoplastic resin sheet substrate, at least one of a recording layer and a reflecting layer, and a protective substrate, and having information given in an optically detectable pit form on the recording layer and/or the substrate, comprises focusing the reproducing light on a recording layer or a reflecting layer through the substrate of the optical card, wherein reproduction of the information is carried out with the optical card bent towards a light source of the reproducing light along the extrusion direction of the thermoplastic resin sheet.

Furthermore, the present apparatus for recording information on an optical card comprising (i) an extrusion-molded thermoplastic resin sheet substrate, wherein tracking grooves in a stripe form are formed on the surface of the resin sheet, and the extrusion direction of the thermoplastic resin sheet is parallel to the direction of the tracking grooves, (ii) a recording layer and/or a reflecting layer, and (iii) a protective substrate, all laid upon one another in this order, comprises a unit including a light source for focusing a light beam on the recording layer surface in the optical card through the substrate; a unit for reciprocally moving the optical card under the focused light beam along the direction of the tracking grooves; a unit for modulating the intensity of the light beam according to the information to be recorded; and characteristically a means for bending the optical card towards or backwards the light source along the direction of the tracking grooves.

Furthermore, the present apparatus for reproducing information recorded on an optical card comprising (i) an extrusion-molded thermoplastic resin sheet substrate having tracking grooves in a stripe form on the surface of the resin sheet, wherein the extrusion direction of the thermoplastic resin sheet is parallel to the direction of the tracking grooves, (ii) at least one of a recording layer and a reflecting layer, and (iii) a protective substrate, where information is given in a pit form on the recording layer and/or the substrate, comprises, a unit including a light source for focusing a light beam on the recording layer surface or the reflecting layer surface in the optical card through the substrate; a unit for reciprocally moving the optical card under the focused light beam along the direction of the tracking grooves; a unit for detecting the reflected light from the recording layer or the reflecting layer; and characteristically a means for bending the optical card towards or backwards the light source along the direction of the tracking grooves.

The present inventors have found that, when resin sheets are prepared by extrusion molding of thermoplastic resin bent in parallel to the extrusion direction of the resin sheets, the occurrence of double refraction is quite low in the resin sheets and have thus accomplished the present invention.

It is not clear why the occurrence of double refraction can be suppressed so low when the resin sheets are bent in the extrusion direction, but it seems due to the following facts.

That is, even if a thermoplastic resin sheet is a polycarbonate resin in amorphous state having a low double refraction, microscopically the long chains of polycarbonate resin are oriented in a certain direction. The long chains of polycarbonate resin have a spiral structure, and when the polycarbonate resin sheet is bent in a direction deviated from the orientation direction of long chains of polycarbonate resin the spiral structure of long chain should be distorted. Therefore to cause bending to a given degree, it is necessary to apply a large force thereto. That is, the term "stress difference" $(\delta_1 - \delta_2)$ in the foregoing equation (1) becomes larger, resulting in an increase in the double refraction. On the other hand, when the polycarbonate resin sheet is bent in a parallel direction to the orientation direction of long chains, only the extension and contraction of the spiral structure of long chains are required, and thus a relatively small force can make bending to the same degree as above. As a result, the term "stress difference" in the equation (1) becomes smaller, resulting in a decrease in the double refraction. In the case of extrusion molding, the resin extrusion direction is identical with the orientation of long chains of the resin, and thus it seems that occurrence of double refraction is less when the resin sheet is curved in the extrusion direction.

BRIEF DESCRIPTION OF THE DRAWINGS

FIG. 2A is a oblique view and FIG. 2B is an enlarged cross-sectional view in part of an optical card.

FIG. 8(A) is a graph showing the quantity of double refraction when a substrate for an optical card is held in a flat state and when it is bent, and FIG. 8(B) shows positions of measurements of the quantity of double refraction of a substrate for an optical card.

DETAILED DESCRIPTION OF THE PREFERRED EMBODIMENTS

Figure 1:
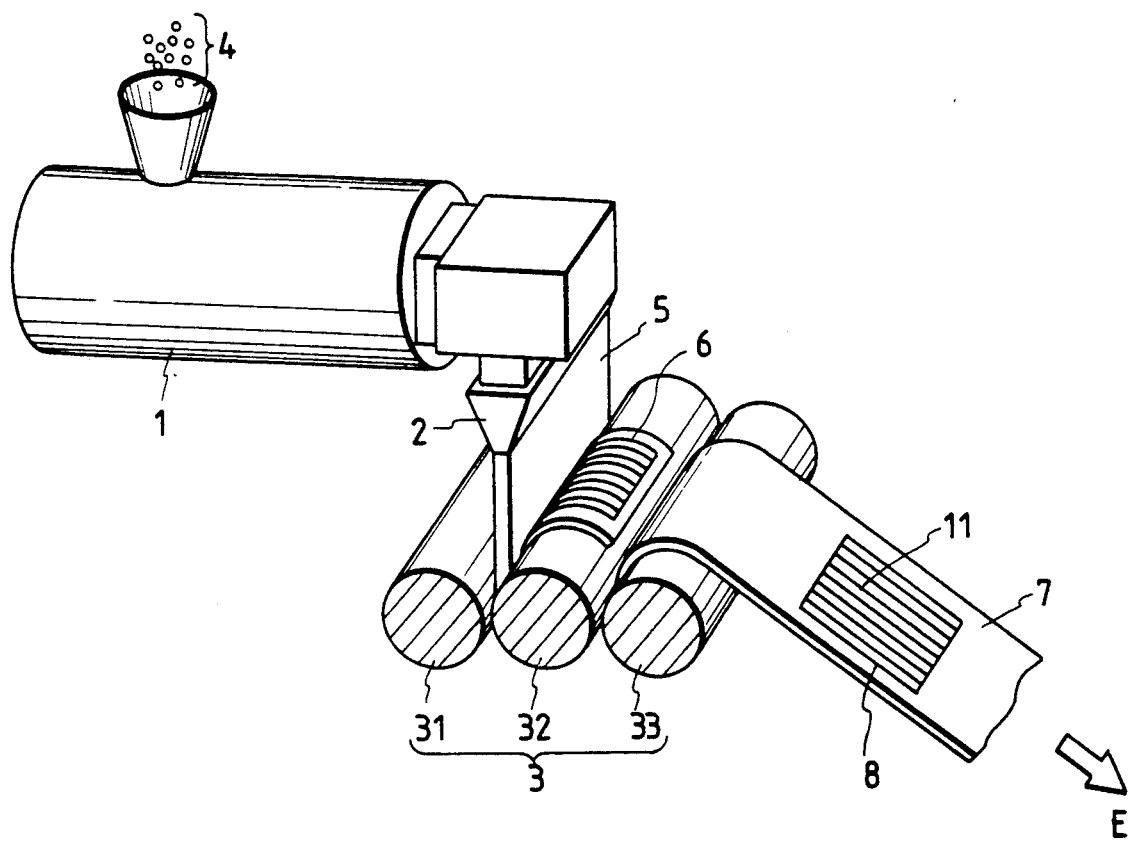
FIG. 1 is a schematic view showing one embodiment of a process for preparing a substrate for an optical card according to the present invention.
Figure 2A:
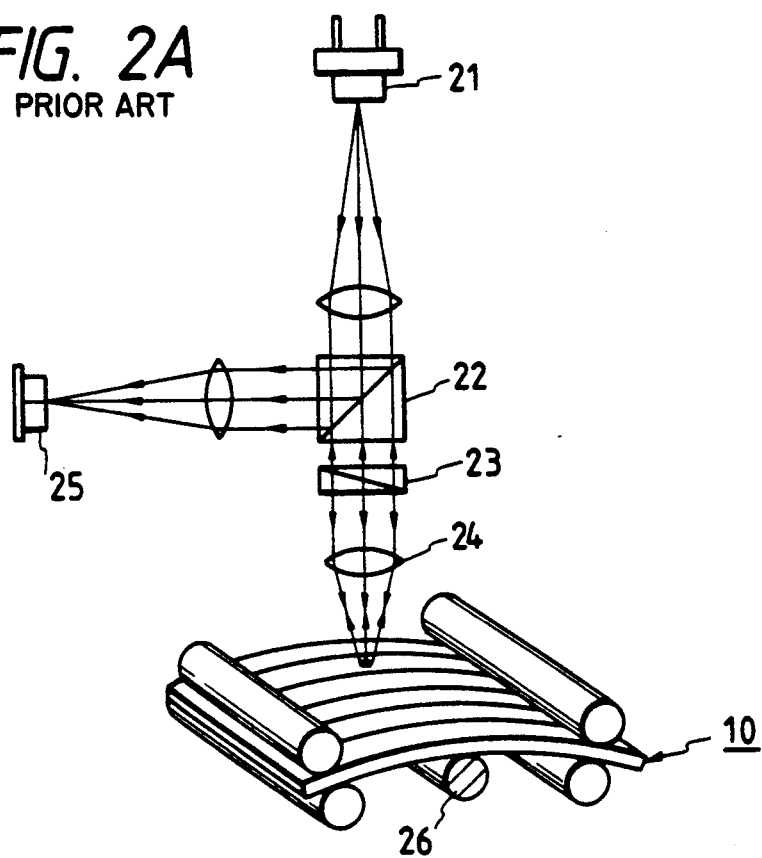
FIGS. 2A and 2B are schematic views of an apparatus for recording and reproducing an optical card, where
Figure 2B:
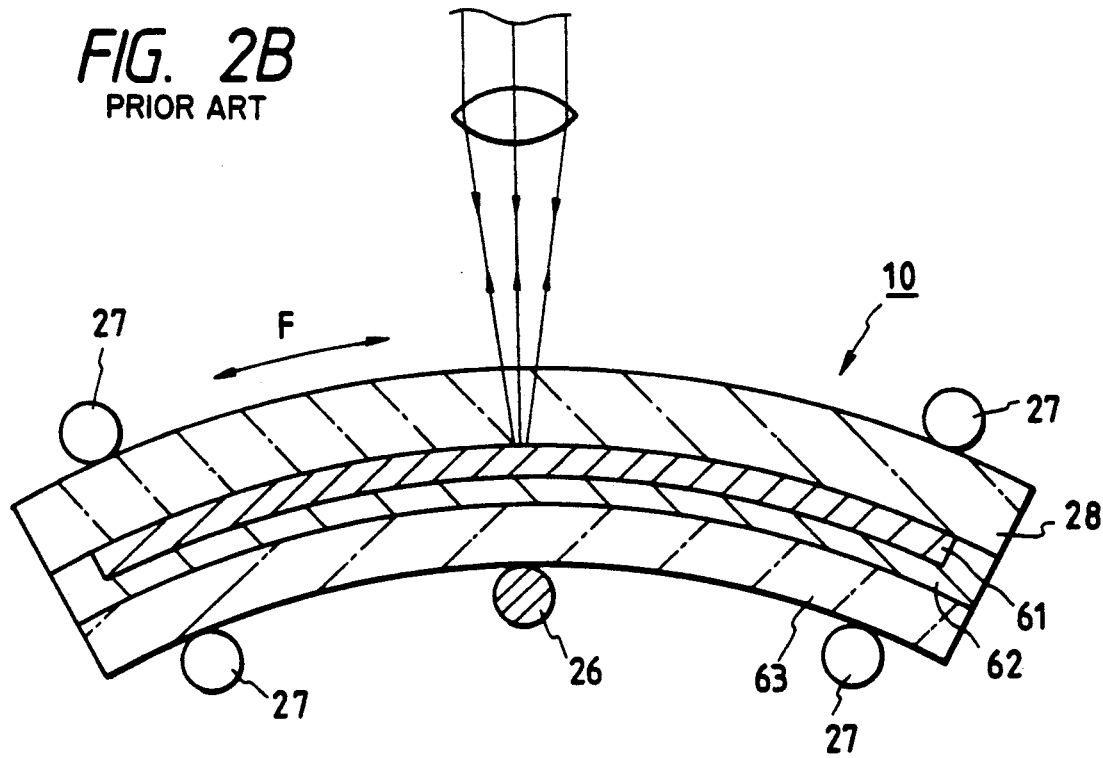

The present invention will be explained in detail below, referring to the drawings.

FIG. 1 is a schematic view showing one embodiment of a process for preparing a substrate for an optical disk according to the present invention.

In FIG. 1, numeral 1 is an extruder for melting and extruding resin, 2 is a T-die for shaping the molten resin into a sheet form, 3 is a press molding part, consisting of three rollers 31, 32 and 33, where 32 is a roll stamper having a preformat pattern 6 on the surface, where the preformat pattern corresponds to the stripy tracking grooves for an optical card, and 31 and 33 are mirror surface rollers.

At first, resin pellets 4 charged into extruder 1 are heated and melted in the extruder, compressed by a screw in the extruder, shaped into a sheet form by the T-die and continuously extruded as a molten resin sheet 5. Then, the resin sheet 5 is pressed between the roller 31 and the roller 32 and between the roller 32 and the roller 33, whereby the preformat pattern 6 on the roller 32 is transferred onto the resin sheet to obtain a substrate 7 for an optical card in a sheet form having a preformat 8 with stripy tracking grooves 11 on the surface.

The present invention is characterized in that the extrusion direction E of resin sheet 5 is in parallel to the direction of tracking grooves in the stripe form of preformat 8. An optical card with less noise, which is capable of suppressing occurrence of double refraction even if the optical card is bent in the direction of tracking grooves during the recording and reproduction can be obtained from the substrate for an optical disk, when the extrusion direction E of extruded and molded thermoplastic resin sheet is in parallel to the direction of tracking grooves in a stripe form.

In the present invention, preformat for an optical card formed on the resin sheet has stripy tracking grooves with a groove width of 0.1 to 5 μm, a groove pitch of 1 to 12 μm and a groove depth of 0.01 to 0.4 μm, or further has prepits in the micron order, etc. besides the tracking grooves.

Figure 3:
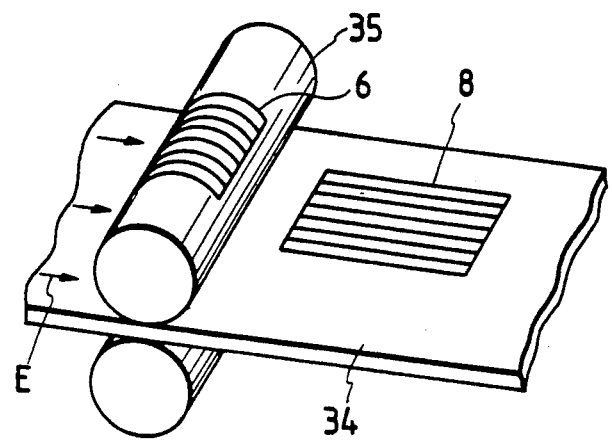
FIG. 3 is a schematic view showing another embodiment of a process for preparing a substrate for an optical card according to the present invention.

Preformat 7 having the tracking grooves on the resin sheet in the present invention can be formed, for example, with a roll stamper coupled with molding of resin sheet, as shown in FIG. 1, or by transferring a preformat pattern 6 onto the already extruded and molded resin sheet 34 with a roll stamper 35 so that the extrusion direction E of resin sheet may be in parallel to the direction of tracking groove, as shown in FIG. 3, or by transferring a preformat pattern onto the resin sheet with a flat stamper plate, or by forming a preformat 8 by 2P process.

In view of the productivity of substrates for optical cards and lower cost of optical cards, the process shown in FIG. 1 is preferable, because molding of resin sheet and formation of preformat 8 can be conducted in one step.

The process shown in FIG. 1 will be further explained below.

According to the process shown in FIG. 1, the resin pellets 4 charged into the extruder 1 are heated and melted in the extruder, compressed by a screw in the extruder and shaped into a sheet form by a T-die. At that time, the resin temperature is 260° to 330° C., preferably 280° to 320° C., for example, in the case of polycarbonate resin, and the resin is continuously extruded from the T-die as a clear molten resin sheet 5. T-die is so provided that the molten sheet can be extruded between rollers 31 and 32 in the press molding part 3. Distance between the tip end of T-die and rollers 31 and 32 is preferably not more than 100 mm so as to prevent solidification before the resin contacts the rollers. The atmosphere temperature around the T-die and the rollers is preferably 60° C. or higher.

Then, the resin sheet extruded between the rollers 31 and 32 is pressed between the heated roll-stamper 32 and press roller 33 to transfer the preformat pattern 6. The roll-stamper 32 is kept at such a temperature that the resin may not solidify on the roll stamper. That is, roll stamper 32 is preferably heated to a temperature within a range of +20° to −20° C. of heat deformation temperature of the resin used. For example, in the case of polycarbonate resin, the surface temperature of roll stamper is preferably heated to 100° C. to 160° C. That is, the molten resin sheet is not quenched in the above-mentioned temperature range and thus neither shrinkage nor deformation takes place on the resin sheet. The temperature of press roller 33 in the press molding part is preferably set to equal or somewhat lower than that of roll stamper 32.

Temperatures of these rollers are controlled, for example, by electrical heating through heaters cast in the rollers or by circulating a heating medium through the centers of rollers.

The thickness of resin sheet 7 for the substrate for an optical card depends upon a clearance between rollers in the press molding part 3, degree of lip opening of T-die, and a difference between the extrusion speed and the stretching speed, that is, degree of strething.

Roll stamper used in the molding process can be prepared, for example, by formation of a photoresist layer on a glass original plate, patterning with a laser beam or electron beam, development to form a resist pattern and then Ni-electroplating to obtain a thin Ni stamper. Then, the thin Ni stamper is fixed to a mirror surface-polished roller roller base with an adhesive or jigs to obtain a roller form stamper. A preformat pattern may be formed directly on a roller base or indirectly on a pattern-forming layer provided on the surface of a roller base.

Figure 4:
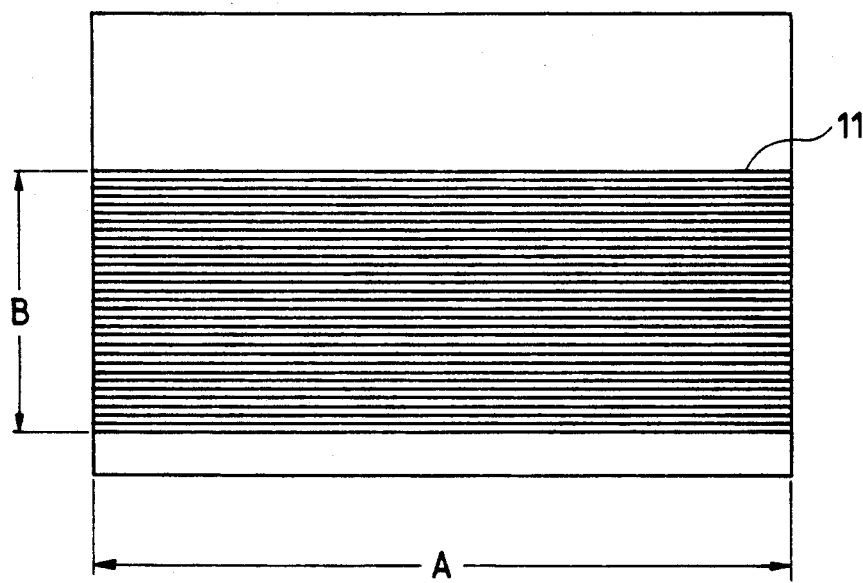
FIG. 4 shows the predetermined size of preformats on a substrate for an optical card.
Figure 5:
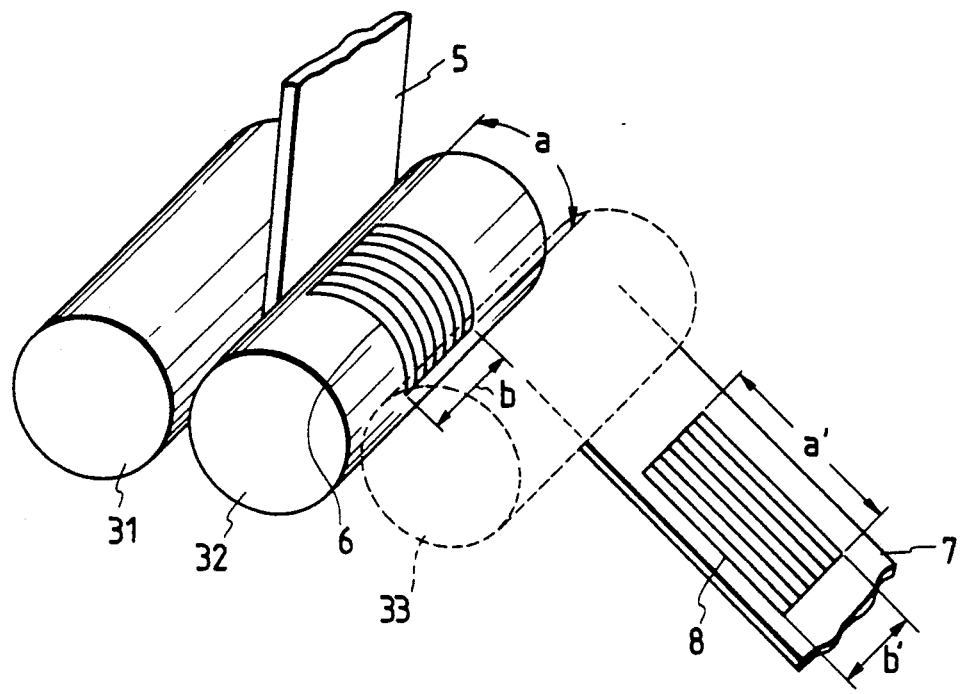
FIG. 5 is a schematic view showing other embodiment of a process for preparing a substrate for an optical card according to the present invention.

When preformat 8 on a substrate for an optical card has predetermined sizes, that is, length A (in the pit writing direction) and width B (tracking groove-transverse direction), as shown in FIG. 4, the preformat pattern 6 on the roll-staper has sizes, i.e. length a corresponding to the length A in the peripheral direction of roll stamper and width b corresponding to the width B in the direction perpendicular to the peripheral direction, and it is preferable to form the preformat so that b/a is larger than B/A. That is, when the preformat pattern 6 is transferred together with molding of resin sheet, shrinkage due to the cooling of resin sheet takes place and particularly larger shrinkage takes place in the direction perpendicular to the extrusion direction of resin sheet, and consequently inexact sizes of preformat on the resin sheet are liable to be obtained. Particularly in the present invention where the extrusion direction of the resin sheet is made in parallel to the direction of tracking grooves, the pitch between the tracking grooves is largely changed, resulting in occurrence of a tracking error. However, by adjusting the sizes of preformat pattern on the roll stamper, as mentioned above, a difference between a' and A and a difference between b' and B can be made smaller and a substrate for an optical card with small tracking error can be prepared, where a' is a length of format 8 formed on the resin sheet and b' is a width thereof, as shown, for example, in FIG. 5. In FIG. 5, the press roller 33 is shown by dotted lines to illustrate the preformat pattern 6 on the roll stamper 32.

When the relationship between A and a and the relationship between B and b are made as given by the following equations (2) and (3), the difference between a' and A and the difference between b' and B can be made very small. Thus, this is very preferable.

$$0.05 \leq \frac{a - A}{A} \times 100 \leq 0.15 \qquad (2)$$

$$0.1 \leq \frac{b - B}{B} \times 100 \leq 0.5 \qquad (3)$$

Furthermore, it is particularly preferable that the relationship between B and b satisfies the following equation (4).

$$0.2 \leq \frac{b - B}{B} \times 100 \leq 0.4 \qquad (4)$$

The thermoplastic resin material for the substrate according to the present invention can be any material that is amorphous and substantially optically isotropic, extrusion-moldable and transparent to a laser beam to be used, and includes, for example, polycarbonate, polystyrene, polyetherimide.

Figure 6:
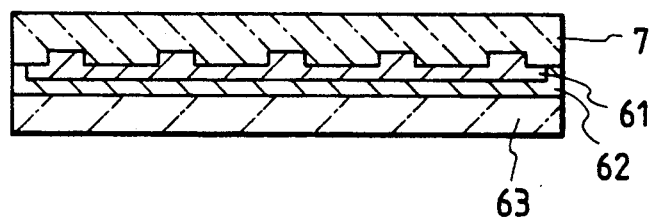
FIG. 6 is a cross-sectional view in a tracking groove-transversing direction of an optical card according to the present invention.

The substrate for an optical card in a sheet form prepared as above is then cut into individual leaves, or a recording layer and a protective layer are formed on the substrate of a sheet form, to prepare optical cards having a cross-section as shown in FIG. 6. FIG. 6 is a cross-sectional view in the grooves-transversing direction of tracking grooves of an optical card according to the present invention, where numeral 61 is a recording layer, 62 an adhesive layer and 63 a protective substrate.

For the recording layer 61 to be formed on the substrate, it is preferable that the energy required for changing the reflectivity by irradiation of a recording energy beam is small. Furthermore, less change in reflectivity of the recorded parts (pits, etc.) and unrecorded parts by irradiation of a reproducing energy beam, is preferred. A magnetic layer of Tb-Fe-Co or Gd-Fe-Co is used for these purposes.

Furthermore, an organic layer capable of changing optical properties by an energy beam can be continuously formed by applying a solution or a dispersion and is suitable for mass production. For example, anthraquinone derivatives having indanthrene skeletons at the front and the rear sides thereof, dioxazine compounds and their derivatives, triphenodithazine compounds, phenanthrene derivatives, cyanine compounds, merocyanine comounds, pyrylium compounds, xanthene compounds, triphenylmethane compounds, croconium dyes, azo dyes, crocones, azines, indigoids, methine dyes, polymethine dyes, azulenes, squarium derivatives, sulfide dyes and metal dithiolate complexes can be enumerated.

An organic layer of any of the above-mentioned pigments can be formed by any well-known coating procedure, for example, dip coating, spray coating, spinner coating, bar coating, roll coating, blade coating, curtain coating, etc. The thickness of the organic layer is generally 500 to 2,000 Å, preferably about 1,000 Å.

In order to prevent the optical recording layer from deterioration by irradiation of a reproducing beam, a stabilizer can be added to any of these pigments. For example, the stabilizer is selected from the following compounds in view of a compatibility with the pigment and a solvent. A few % by weight to 50% by weight of the stabilizer can be added to the pigment on the basis of the pigment. When the amount of the stabilizer is too small, the effect as the stabilizer cannot be expected, whereas, when more than 50% by weight of the stabilizer is added, an absolute amount of heat-mode recording material is decreased and a reduction in the sensitivity is observed. Thus, addition of 10% by weight to 30% by weight of the stabilizer to the pigment on the basis of the pigment is preferable. Particularly preferable is about 20% by weight because a high effect can be obtained without any reduction of the sensitivity.

The stabilizer includes, for example, various metal chelate compounds, particularly polydentate ligands having Zn, Cu, Ni, Cr, Co, Mn, Pd and Zr as center metals, for example, tetradentate ligands such as $N_4$, $N_2O_2$, $N_2S_2$, $S_4$, $O_2S_2$, $O_4$, etc , or tridentate ligands such as $N_2O$, $NO_2$, $NS_2$, $O_3$, NOS, etc. and other ligands such as water, ammonia, halogen, phosphine, amine, arsine, olefine, etc. or tetradentate type of two bidentate ligands such as $N_2$, NO, $O_2$, and $S_2$, furthermore bicyclopentadienyl ligands, cyclopentadienyl-tropylinium ligands, or combinations thereof, and furthermore, various aromatic amines or diamines, nitrogen-containing aromatic compounds and their onium salts, for example, aminium salts, diimonium salts, pyridinium salts, imidazoliniium salts, quinolinium salts, etc. Furthermore, pyrylium salts, etc. as oxygen-containing aromatic salts may be used. A combination of some of these stabilizers can be also used. A proportion (composition ratio) can be appropriately selected in view of the coatability of pigment composition, stability of coating layer, optical characteristics (reflectivity and transmissivity), recording sensitivity, etc.

An adhesive for the adhesive layer 62 can be selected from a wide range in order not to attach the recording layer due to the covering of recording layer 61. The adhesive for use in the adhesive layer includes, for example, vinyl acetate-based adhesives, vinylacryl acetate-based adhesives, vinyl acetate copolymer-based adhesives, vinyl acetate emulsion-based adhesives, acrylic adhesives, acrylate-based adhesives, acrylic copolymer-based adhesives, ethylenic adhesives, ethylene-vinyl acetae-based adhesives, ethylene-vinyl acetate copolymer-based adhesives, polyethylene-based adhesives, methylene chloride-based adhesives, polyamide-based adhesives, polyamide-amine-based adhesives, polyimide-based adhesives, urea-based adhesives, epoxy adhesives, epoxyurethane-based adhesives, epoxyacrylate-based adhesives, urethane acrylate-based adhesives, polyester-based adhesives, chloroprene-based adhesives, chloroprene rubber-based adhesives, nitrile-based adhesives, nitrile rubber-based adhesives, urethane-based adhesives, vinylurethane-based adhesives, polyurethane-based adhesives, olefinic adhesives, cyanoacrylate-based adhesives, alkyl acrylate-based adhesives, vinylchloride-based adhesives, phenolic adhesives, SBR (styrene-butadiene rubber)-based adhesives, polyol-based adhesives, silica-alumina-based adhesives, synthetic rubber-based adhesives, emulsion-based adhesives, oligoester-based adhesives, cellulosic adhesives, formaldehyde-based adhesives, ultraviolet-curing type adhesives, organic solvents, styrene-butadiene-freon TA-based adhesives, etc. Those which require such types of energy as heat, light, electron beam, etc. for the adhesion are also effective unless the energy deteriorates the function of the optical recording material.

For the protective substrate 63, any material that can be used as the ordinary card substrate is applicable in the present invention, and specifically polyvinyl chloride, fluorine-substituted ethylene polymer, vinyl chloride-vinyl acetate copolymer, polyvinylidene chloride, acrylic polymers such as polymethyl methacrylate, etc., polystyrene, polyvinylbutyral, acetylcellulose, styrene-butadiene copolymer, polyethylene, polypropylene, polycarbonate, epoxyacrylonitrite-butadiene-styrene copolymer, etc. can be used.

Sometimes, metal sheets of iron, stainless steel, aluminum, tin, copper, zinc, etc., synthetic paper, paper or fiber-reinforced plastics, compound materials of metal powder such as magnetic powder, etc. and plastics, ceramics can be widely used in view of the uses. It is needless to say that those used in transparent substrates can be also employed.

Apparatus for recording and reproducing information on an optical card according to the present invention will be explained below, referring to FIG. 7.

Figure 7:
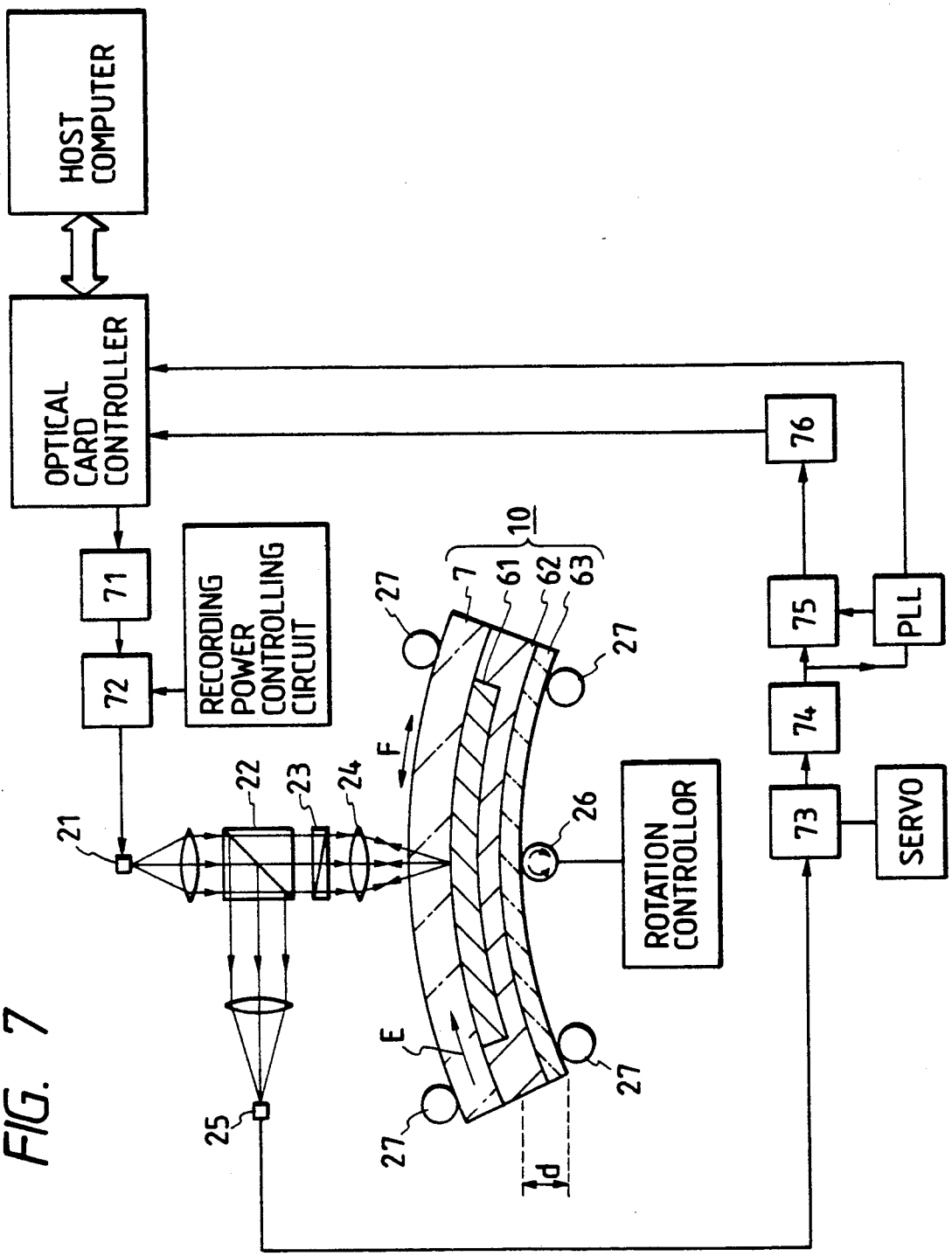
FIG. 7 is a schematic view of an apparatus for recording and reproducing information on an optical card according to the present invention.

The apparatus shown in FIG. 7 has both functions of recording and reproduction. At first, the recording mode of the apparatus will be explained.

Data transmitted from a host computer are subjected to conversion of parallel data to serial data, addition of error correction symbols thereto, etc. by an optical card controller and then the serial data are converted to code signals by a modulator circuit 71. Then, the data converted to the code signals are transmitted to a laser diode 21 through a laser diode drive circuit 72 to be irradiated through a substrate as a recording beam to a recording layer, thus the information is recorded on an optical card. The optical card 10 reciprocally moves facing to the recording beam by a driving means 26 and is bent by an optical card bending means 27 at the same time to improve the flatness of the recording beam-irradiated plane and further prevent the slipping of the optical card during the driving. By bending the optical card in parallel to the extrusion direction of the extrusion-molded thermoplastic resin sheet used in the substrate for the optical card, substantially no double refraction occurs in the substrate for the optical card, and exact pits without any spreading can be formed in the recording layer.

Reproduction mode of the apparatus shown in FIG. 7 will be explained below.

In the reproduction mode, modulator and control systems 71 and 72 for the laser diode are appropriately adjusted so as not to give any fluctuation to the intensity of laser output. Output level from the laser diode is set to a lower value than the necessary level for forming pits in the recording layer or reflecting layer of optical card 10. Then, the laser beam is focused on the recording layer surface or reflecting layer surface of the optical card 10 through PBS 22, QWP 23, a focusing lens 24 and the substrate 7. The light reflected on the recording layer surface or the reflecting layer surface passes again through QWP 23 and reflected on PBS 22 due to difference of polarizing plane from the incident light by 90° and enters an optical detector 25.

The intensity of light entering the optical detector 25 changes as the focused beam passes over the pit parts of the recording layer or the reflecting layer.

Output of light detector 25 is amplified by an amplifier 73 and is converted to reproduction signals and signals for the focusing servo and tracking servo by a matrix circuit 73. Then, the reproduction signal output from the matrix circuit is converted to digital signals by a comparator 74 and then clock signals are extracted therefrom by a PLL circuit. The clock signals perform a synchronous demodulation of reproduction signals in a data synchronous detecting system 75. Then, the synchronously demodulated reproduction signals are returned to the original data by a reversed algorithm of the modulation in a demodulation circuit 76, and then transmitted to the optical card controller to be read by the host computer.

In the reproduction mode, the optical card 10 is reciprocally moved with respect to the reproducing beam by the driving means 26 and bent to a convex form or a concave form with respect to the light source 21 by the optical card-bending means 27 to improve the flatness of reproducing light-reflected plane and prevent the slipping, etc. of the optical card as in the recording mode. By bending the optical card in parallel to the extrusion direction of the extrusion-molded thermoplastic resin sheet used in the substrate for the optical card 10, substantially no double refraction occurs in the substrate for the optical card and consequently the reproducing light reflected on the recording layer or reflecting layer will not generate noises on the light source due to passage of the reflected reproducing light through PBS, and reproduction of signal with a high S/N ratio can be obtained.

As explained above, the tracking grooves on the substrate for an optical card is molded in the parallel to the extrusion direction of the resin sheet, and an optical card prepared from the thus prepared substrate can keep the occurrence of double refraction low and stable as the card is bent along the extrusion direction of the sheet during the recording and reproduction, and thus an optical card with a high key/N ratio, etc. can be obtained.

Furthermore, a preformat of optical card, for example, tracking grooves, specifically those in a stripe form with a groove width of 3 $\mu$m and track pitch of 12 $\mu$m, is formed. Particularly the fluctuation of track pitch is suppressed to a range of 12 $\mu$m $\pm$0.1 $\mu$m, as set forth by the code, and outside this range tracking errors frequently occur during the recording and reproduction.

Thus, in the formation of a preformt for an optical card with sizes of A $\times$ B, as shown in FIG. 4, changes in the dimensions of the preformat by shinkage of the sheet due to cooling after the extrusion-molding can be adjusted by making b/a larger than B/A, where a is the length in the peripheral direction of the preformat pattern on the roll stamper for the transfer and b is the width in the direction perpendicular to the peripheral direction, as in the present invention, and thus substrates for optical cards having an exact preformat can be mass-produced.

Furthermore, an optical card in a high C/N ratio with less tracking error can be obtained according to the present invention.

PREFERRED EMBODIMENTS OF THE INVENTION

The present invention will be described in detail below, referring to Examples.

EXAMPLE 1

A substrate 7 for an optical card was prepared through a coat hunger type T-die 2, 20 cm wide, downwardly set to an extruder 1 with a screw, 35 mm in diameter, as shown in FIG. 1. As resin, polycarbonate resin (Panlite L-1250, trademark of a product made by Teijin Kasei K.K.) was used. A press molding section was composed of mirror surface-polished rolls 31 and 33 and a roll stamper 32.

The resin extrusion conditions were such that barrel temperatures were 300° C. at part a (Ta) of extruder 1, 300° C. at part b (Tb), 320° C. at part c (Tc), and temperature of T-die 2 (Td) was 320° C. Under such conditions, a molten resin sheet was formed, where the resin temperature was 280° C. to 320° C.

The roll stamper 32 was kept at 140° C., while the roll was kept at a temperature 1° to 2° C. lower than that of roll stamper 32, and the roll 33 was kept at a temperature 20° to 21° C. higher than that of roll stamper 32.

A clearance between the lip of T-die and the press molding section was set to 50 mm and the atmosphere from the point of resin sheet extrusion to the press molding section was controlled to 60° C. or higher by providing a heating box around the passage of from the extrusion point to the press molding section. Degree of lip opening of T-die was set to 0.48 mm, and a gap between the roll 31 and the roll stamper 32 in the press molding section was set to 0.4 mm. Under these conditions, a preformat pattern 6 on the roll stamper 32 was transferred onto a resin sheet 5 to mold a substrate for an optical card, 0.4 mm thick, with a preformat 8 composed of 2,583 tracking grooves at a pitch of 12 $\mu$m and a track width of 3 $\mu$m, arranged in parallel to the extrusion direction E.

Figure 8A:
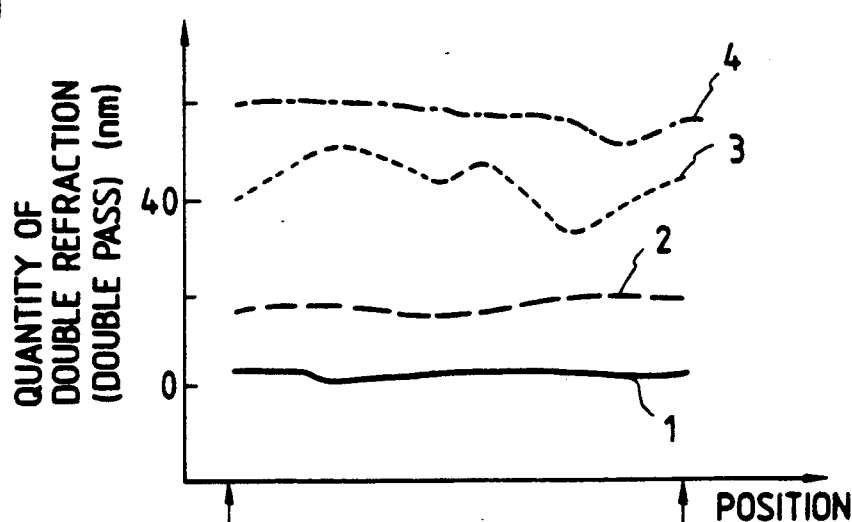
FIGS. 8(A) and 8(B) illustrate Example 1 and Comparative Examples 1 and 2, where
Figure 9:
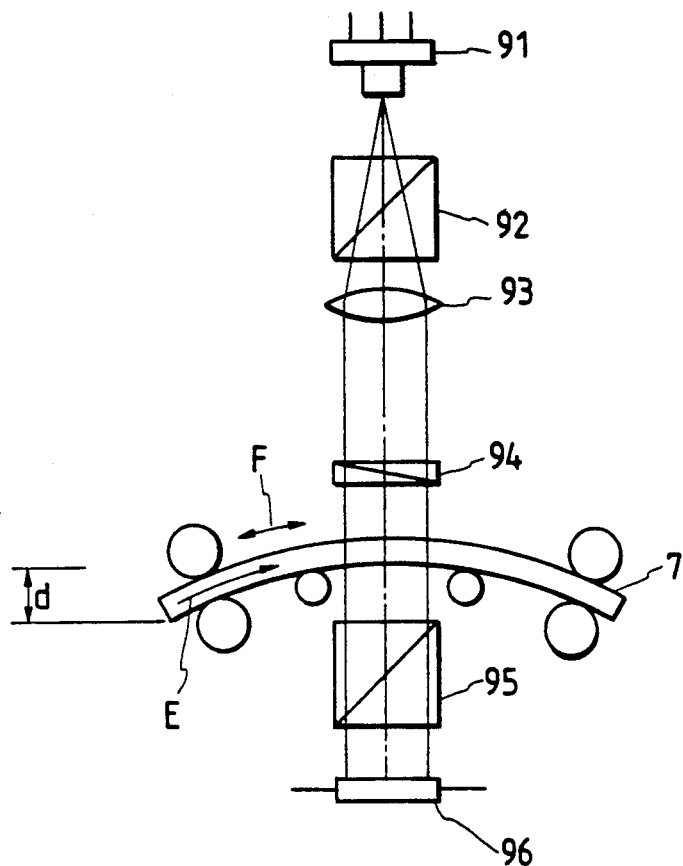
FIG. 9 is a schematic view of an apparatus for measuring the degree of double refraction used in Examples.

The thus obtained substrate for an optical card was subjected to measurement of double refraction of the substrate when the substrate was maintained in a flat plate state and also when the substrate was bent in parallel to the extrusion direction E of the resin sheet, as shown in FIG. 9. The results are shown in FIG. 8(A).

Measurement of double refraction was carried out with a measuring apparatus provided with a transmission type, circular polarized light incident type optical system, as shown in FIG. 9, where numeral 91 is a laser diode, 92 a polarizer, 93 a collimator lens, 94 QWP, 95 an analyzer and 96 a light detector. The wavelength of laser diode was set to 780 nm and the curvature d was set to 5 mm. The double refraction was measured for the recording track shown by G in FIG. 8(B).

Figure 8B:
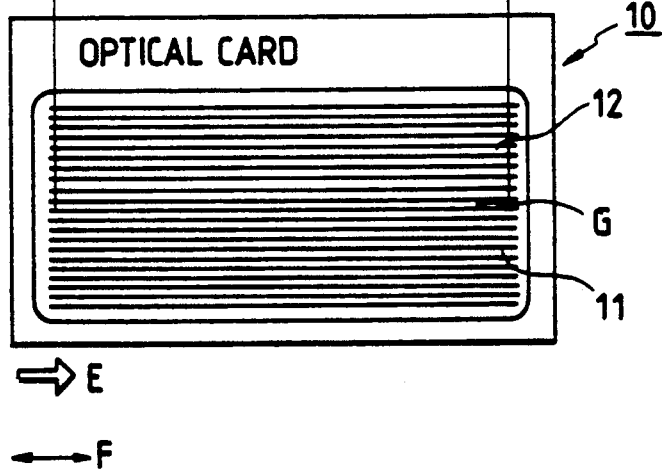

In the diagram shown in FIG. 8(A), the values obtained by the measuring apparatus for double refraction shown in FIG. 9 were plotted as two-fold values. In FIG. 8(A), ① refers to the double refraction when the substrate was kept in a flat plate state and ② refers to the double refraction when the substrate was bent.

Then, the surface on the preformat-having side of the substrate for an optical card was coated with 1,1,5,5-tetrakis(p-diethylaminophenyl)-1,3-pentadienyl perchlorate as a polymethine dye to a thickness of 1,000 Å, and a polycarbonate resin sheet having a thickness of 0.3 mm was attached thereon through a hot melt adhesive sheet to obtain an optical card.

Then, the thus obtained optical card 10 was bent in the extrusion direction of substrate 7 (d=5 mm), as shown in FIG. 7, and the optical card 10 was driven at 60 mm/sec with a driving means 26. Signal having a frequency of 100 KHz was recorded in the recording track G with a recording power of 3 mW, using a semiconductor laser having a wavelength of 780 nm. Then, the recording track G was scanned with a semiconductor laser power of 0.3 mW to reproduce the signal. C/N ratio of the signal obtained at that time is shown in Table 1.

COMPARATIVE EXAMPLE 1

Figure 10:
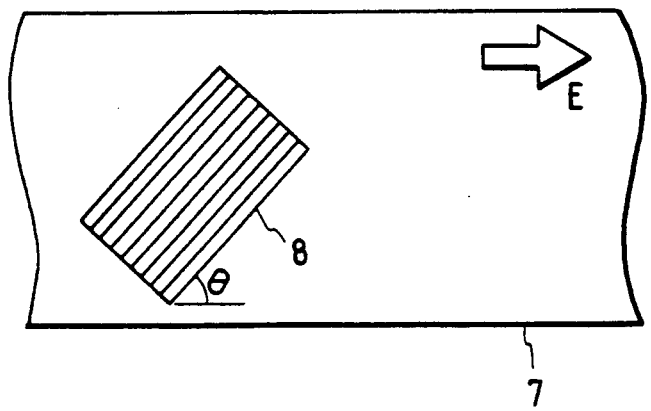
FIG. 10 illustrates comparative Example 2.

A substrate 7 for an optical card of polycarbonate resin was prepared in the same manner as in Example 1, except that the preformat having the tracking grooves was formed as inclined at 45° ($\theta=45°$) to the extrusion direction E, as shown in FIG. 10.

The thus prepared substrate for an optical card was subjected to measurement of double refraction in the same manner as in Example 1 while keeping the substrate in a flat plate state. No substantial double refraction was observed as given by ① in the diagram of FIG. 8A.

Then, the substrate for an optical card was bent in the parallel direction to the tracking grooves, that is, in parallel to the direction of 45° inclination to the extrusion direction E to measure the double refraction in the same manner as in Example 1. It was so formed that the double refraction was increased as shown by ③ in the diagram of FIG. 8(A).

Then, the substrate for an optical card was laminated with a recording layer and a protective layer in the same manner as in Example 1 to prepare an optical card. The thus prepared optical card was subjected to recording and reproduction of information in the same manner as in Example 1. C/N ratio obtained at that time is shown in Table 1.

COMPARATIVE EXAMPLE 2

A substrate 7 for an optical card polycarbonate resin was prepared in the same manner as in Example 1, except that the tracking grooves were formed as inclined at 90° ($\theta=90°$).

The thus prepared substrate for an optical card was subjected to measurement of double refraction in the same manner as in Example 1 while keeping the substrate in a flat plate state. No substantial double refraction was observed as given by ① in the diagram of FIG. 8(A).

Then, the substrate for an optical card was bent in the direction parallel to the tracking grooves, that is, in the direction perpendicular to the extrusion direction to measure the double refraction in the same manner as in Example 1. It was found that the double refraction was increased as shown by ④ in the diagram of FIG. 8(A).

Then, the substrate for an optical card was laminated with a recording layer and a protective layer in the same manner as in Example 1 to prepare an optical card. The thus prepared optical card was subjected to recording and reproduction of information in the same manner as in Example 1. C/N ratio obtained at that time is shown in Table 1.

TABLE 1

| | Recording and Reproducing Characteristics | | |
| --- | --- | --- | --- |
| | Ex. 1 | Comp. Ex. 1 | Comp. Ex. 2 |
| C/N | 51.2 dB | 45.3 dB | 47.2 dB |

TABLE 1-continued

| | Recording and Reproducing Characteristics | | |
| --- | --- | --- | --- |
| | Ex. 1 | Comp. Ex. 1 | Comp. Ex. 2 |
| Carrier level | −20.6 | −21.2 | −20.5 |
| Noise level | −71.8 | −66.5 | −67.7 |

As described above, the substrate for an optical card, when bent in parallel to the extrusion direction of resin sheet, does not cause much increase in the double refraction even by bending of the substrate, and has no positional dependency and can produce an optical card having characteristics excellent in recording and reproducing.

EXAMPLE 2

A substrate 7 for an optical card was prepared by using the same apparatus as shown in FIG. 1 in the same manner as in Example 1, except that as the roll stamper 32, a roll stamper having a preformat pattern with length a in the peripheral direction of the roll stamper and width b in the direction perpendicular to the peripheral direction, as shown in FIG. 5, was used. The length a and width b of the preformat pattern corresponded to the predetermined length A and width B formed on the substrate for an optical card, respectively, as shown in FIG. 4.

In this Example, as the predetermined sizes of preformat formed on the substrate for an optical card, as shown in FIG. 4, the length A was set to 85.590 mm and the width B set to 30.990 mm, and 2,583 tracking grooves were formed at equal intervals in parallel to the longitudinal direction of the preformat with a tracking groove width of 3 μm and a tracking groove depth of 3,000° Å in the area defined by A and B.

The length a of preformat pattern corresponding to the preformat was set to 85.848 mm and the width b set to 31.020 mm, and 2,583 groove patterns corresponding to the track grooves were formed at equal intervals in parallel to the longitudinal direction of the preformat pattern in the area defined by a and b.

In the preformat 8 formed on the substrate for an optical card prepared by the roll stamper, the length was defined by a' and the width by b', as shown in FIG. 5, and a' and b' were measured to determine deviations of a' and b' on the basis of the predetermined length A and the predetermined width B of the preformat respectively.

An optical card was prepared by using the substrate in the same manner as in Example 1 and information was recorded on the optical card in the same manner as in Example 1, and then 100 reproductions were repeated. The results are shown in Table 2.

EXAMPLES 3 to 5

Substrates 7 for optical cards were prepared in the same manner as in Example 2, except that the length a and the width b of the preformat pattern on the roll stamper 32 used in Example 2 was changed as shown in Table 2.

Deviations of the length a' and the width b' of preformat 8 formed on the substrates for optical cards from the predetermined sizes A and B of the preformat for an optical card, respectively, as shown in Example 2 were determined.

Optical cards were prepared by using the substrates in the same manner as in Example 2 to record information, and subjected to a repeated reproduction test. The results are shown in Table 2.

COMPARATIVE EXAMPLE 3

A substrate for an optical card was prepared in the same manner as in Example 2, except that the length a and the width b of the preformat pattern on the roll stamper 32 were made equal to the predetermined length A and the predetermined width B of the optical card in Example 2. Deviations of the length a' and the width b' of preformat 8 formed on the substrate for an optical card from the predetermined sizes A and B of the preformat for an optical card, respectively, as shown in Example 2, were determined.

An optical card was prepared by using the substrate in the same manner as in Example 2 to record information and subjected to a repeated reproduction test. The results are shown in Table 2.

TABLE 2

|  | Sizes of preformat pattern on roll stamper (mm) | Sizes of preformat on substrate (mm) | Deviations from the predetermined sizes A and B of preformat ($\mu$m) | Frequency of tracking error occurrence |
| --- | --- | --- | --- | --- |
| Ex. 2 | | | | |
| $100 \times (a - A/A) = 0.1$ | a 85.848 | a' 85.593 | 3 | ⊚ |
| $100 \times (b - B/B) = 0.3$ | b 31.020 | b' 30.900 | 0 | |
| Ex. 3 | | | | |
| 0.15 | a 85.931 | a' 85.677 | 87 | ○ |
| 0.40 | b 31.036 | b' 31.004 | 14 | |
| Ex. 4 | | | | |
| 0.05 | a 85.677 | a' 85.420 | 170 | ○ |
| 0.10 | b 31.005 | b' 30.976 | 14 | |
| Ex. 5 | | | | |
| 0.07 | a 85.803 | a' 85.547 | 43 | ⊚ |
| 0.25 | b 31.012 | b' 30.980 | 10 | |
| Comp. Ex. 3 | | | | |
| 0 | a 85.590 | a' 85.333 | 257 | X |
| 0 | b 30.990 | b' 30.959 | 31 | |

⊚: No occurrence of tracking error at all
○: Substantially no occurrence of tracking error
X: Frequent occurrence of tracking error

What is claimed is:

1. A process for preparing a substrate for an optical card comprising molding tracking grooves in a stripe form on an extrusion-molded thermoplastic resin sheet by using a roll stamper so that the extrusion direction of the thermoplastic resin sheet is made parallel to the direction of the tracking grooves, wherein
   a template pattern corresponding to the tracking grooves is provided on the peripheral surface of the roll stamper and the stripe direction of the template pattern is perpendicular to the axis of the roll stamper, and a track pitch of the template pattern is larger than a track pitch of the optical card which is set to avoid tracking errors.

2. A process for producing an optical card substrate in a sheet form, comprising forming tracking grooves in parallel lines on the surface of an extrusionmolded thermoplastic resin sheet by using a roll stamper in a manner such that the extrusion direction of the thermoplastic resin sheet is parallel to the direction of the tracking grooves, wherein
   a template pattern having a width b along a stamper axis corresponding to tracking grooves is provided on the peripheral surface of the roll stamper and the stripe direction of the template pattern is perpendicular to the axis of the roll stamper, and said width 6 of the template pattern is larger than width b' of a preformat of the optical card having a given number of tracking grooves and a tracking pitch which is set to avoid tracking errors.

3. A roll stamper comprising an axis and a peripheral surface on which a template pattern of parallel lines corresponding to tracking grooves of an optical card is provided, for forming the tracking groove onto a resin sheet in succession to molding the resin sheet into the optical card substrate sheet, wherein
   the template pattern of parallel lines corresponding to tracking grooves are provided in a direction that the parallel lines are perpendicular to the axis of the roll stamper, and a track pitch of the template pattern is larger than a track pitch of an optical card which is set to avoid tracking errors.

4. A roll stamper having a template pattern on a peripheral surface thereof, for forming a preformat pattern of a predetermined number of tracking grooves of parallel lines on a res..n sheet, wherein
   the template pattern of parallel lines having a width b along a stamper axis corresponding to tracking grooves are provided in a direction that the parallel lines are perpendicular to the axis of the roll stamper, and said width 1 of the template pattern is larger than a width b' of the preformat of the optical card having a predetermined number of tracking grooves and a tracking pitch which is set to avoid tracking errors.

5. An apparatus for continuous production of an optical card substrate in a sheet form, forming tracking grooves in parallel lines on the surface of an extrusion-mold thermoplastic resin sheet in a manner that the extrusion direction of the thermoplastic resin sheet is parallel to the direction of the tracking grooves, comprising a roll stamper having a template pattern of parallel lines corresponding to said tracking grooves on its peripheral surface, wherein
   the direction of the template lines is perpendicular to the axis of the roll stamper and a track pitch of the tempalte pattern is larger than a track pitch of the optical card which is set to avoid tracking errors.

6. An apparatus for continuous production of an optical card substrate in a sheet form, forming a preformat tracking grooves of parallel lines on the surface of an extrusion-molded thermoplastic resin sheet in a manner that the extrusion direction of the thermoplastic resin sheet is parallel to the direction of the tracking grooves, comprising a template pattern of parallel lines having a width b along a stamper axis corresponding to tracking grooves is provided on the peripheral surface of the roll stamper wherein the line direction of the template pattern is perpendicular to the axis of the roll stamper, and said width b of the template pattern is larger than the a width b' of the preformat of the optical card having a predetermined number of tracking grooves and a tracking pitch which is set to avoid tracking errors.

* * * * *

UNITED STATES PATENT AND TRADEMARK OFFICE
CERTIFICATE OF CORRECTION

PATENT NO. : 5,267,228
DATED : November 30, 1993
INVENTOR(S) : MASATAKA YASHIMA, ET AL.

Page 1 of 3

It is certified that error appears in the above-indentified patent and that said Letters Patent is hereby corrected as shown below:

COLUMN 1

Line 25, "multicomponent" should read --multi-component--.
    Line 29, "multi-comonent" should read --multi-component--.
    Line 31, "photoirradiation" should read
          --photo-irradiation--.
    Line 67, "by 90°" should read --by a 90°--.

COLUMN 3

Line 3, "Still" should read --A still--.
    Line 9, "Still" should read --A still--.
    Line 12, "Still" should read --A still--.
    Line 43, "light" should read --a light--.

COLUMN 4

Line 44, "backwards" should read --backwards from--.
    Lines 63-64, "backwards" should read --backwards from--.

COLUMN 5

Line 48, "other" should read --another--.

COLUMN 7

Line 34, "strething" should read --stretching--.
    Line 41, "roller roller" should read --roller--.
    Line 50, "roll-staper" should read --roll-stamper--.

UNITED STATES PATENT AND TRADEMARK OFFICE
CERTIFICATE OF CORRECTION

PATENT NO. : 5,267,228
DATED : November 30, 1993
INVENTOR(S) : MASATAKA YASHIMA, ET AL.

It is certified that error appears in the above-indentified patent and that said Letters Patent is hereby corrected as shown below:

COLUMN 8

Line 56, "triphenodithazine" should read --triphenodithiazine--.
Line 59, "comounds," should read --compounds,--.

COLUMN 9

Line 24, "etc ," should read --etc.,--.
Line 34, "imidazoliniium" should read --imidazolinium--.
Line 51, "acetae-based" should read --acetate-based--.

COLUMN 11

Line 44, "key/N ratio," should read --C/N ratio,--.
Line 54, "preformt" should read --preformat--.

COLUMN 12

Line 9, "coat hunger" should read --coat hanger--.

COLUMN 13

Line 42, "1. ex-" should read --1, ex- --.

COLUMN 15

Line 57, "extrusionmolded" should read --extrusion-molded--.
Line 67, "width 6" should read --width b--.

UNITED STATES PATENT AND TRADEMARK OFFICE
CERTIFICATE OF CORRECTION

PATENT NO. : 5,267,228
DATED : November 30, 1993
INVENTOR(S) : MASATAKA YASHIMA, ET AL.

It is certified that error appears in the above-indentified patent and that said Letters Patent is hereby corrected as shown below:

COLUMN 16

Line 45, "width 1" should read --width b--.
    Line 53, "mold" should read --molded--.
    Line 61, "tempalte" should read --template--.
    Line 64, "a preformat" should be deleted.

COLUMN 17

Line 4, "stamper" should read --stamper,--.

COLUMN 18

Line 1, "the a" should be deleted.

Signed and Sealed this

Thirteenth Day of September, 1994

Attest:

BRUCE LEHMAN

Attesting Officer     Commissioner of Patents and Trademarks